United States Patent
Smith et al.

(10) Patent No.: US 6,742,033 B1
(45) Date of Patent: May 25, 2004

(54) SYSTEM, METHOD AND COMPUTER PROGRAM PRODUCT THAT PRE-CACHES CONTENT TO PROVIDE TIMELY INFORMATION TO A USER

(75) Inventors: Kim C. Smith, Dove Canyon, CA (US); Peter E. Martinez, North Richland Hills, TX (US)

(73) Assignee: Gateway, Inc., Poway, CA (US)

( * ) Notice: Subject to any disclaimer, the term of this patent is extended or adjusted under 35 U.S.C. 154(b) by 724 days.

(21) Appl. No.: 09/594,749

(22) Filed: Jun. 12, 2000

(51) Int. Cl.[7] .................................. G06F 15/173
(52) U.S. Cl. .................. 709/224; 709/216; 711/126
(58) Field of Search ................... 709/224, 216; 718/102; 725/110; 711/126

(56) References Cited

U.S. PATENT DOCUMENTS

| | | | |
|---|---|---|---|
| 5,150,472 A | 9/1992 | Blank et al. ............... 395/425 |
| 5,727,129 A | 3/1998 | Barrett et al. .............. 395/12 |
| 5,737,619 A | 4/1998 | Judson ..................... 395/761 |
| 5,740,430 A | 4/1998 | Rosenberg et al. ......... 395/616 |
| 5,860,071 A | 1/1999 | Ball et al. ................. 707/100 |
| 5,870,557 A | 2/1999 | Bellovin et al. ........ 395/200.54 |
| 5,878,213 A | 3/1999 | Bittinger et al. ....... 395/200.33 |
| 5,878,223 A | 3/1999 | Becker et al. .......... 395/200.53 |
| 5,913,040 A | 6/1999 | Rakavy et al. ......... 395/200.62 |
| 5,931,904 A | 8/1999 | Banga et al. ............... 709/217 |
| 5,961,602 A | 10/1999 | Thompson et al. ......... 709/229 |
| 6,317,792 B1 * | 11/2001 | Mundy et al. .............. 709/227 |
| 6,332,127 B1 * | 12/2001 | Bandera et al. ............. 705/14 |
| 6,366,298 B1 * | 4/2002 | Haitsuka et al. ............ 345/736 |
| 6,591,288 B1 * | 7/2003 | Edwards et al. ............ 709/203 |

* cited by examiner

*Primary Examiner*—David Wiley
*Assistant Examiner*—Scott M. Collins
(74) *Attorney, Agent, or Firm*—Scott Charles Richardson; Jeffrey A. Proehl; Leonard & Proehl, Prof. L.L.C.

(57) ABSTRACT

A system, method and computer program product that pre-caches or downloads information from internet sites that the system expects the user to request. The system schedules the pre-caching to occur at the most appropriate time of day in order to increase the likelihood that the most recent information is provided to the user in a timely manner. Actual usage is monitored to adjust to user-changing habits, conserve resources at both the server and client ends, and prioritize information against interrupted downloads and exhausted or limited cache or memory space. For users that use the telephone to dial-in to the internet, the system and method pre-caches content in a manner which decreases the likelihood that the pre-caching process will interfere with the user's use of the telephone for other purposes.

56 Claims, 4 Drawing Sheets

SYSTEM, METHOD AND COMPUTER PROGRAM PRODUCT THAT PRE-CACHES CONTENT TO PROVIDE TIMELY INFORMATION TO A USER

BACKGROUND OF THE INVENTION

The field of the present invention relates generally to a system for facilitating browsing the internet; and, more particularly to a system that pre-caches internet content expected to be requested by the user wherein the pre-caching occurs at the most appropriate time of day so as to provide the most recent information to the user in a timely manner, and avoids interfering with use of the telephone line for other purposes for users that use the telephone line to connect to the internet.

The internet is a distributed network comprising numerous other networks that together permit access and use by numerous remote users. The dominant protocol for transmitting information between computers on the internet is the TCP/IP network protocol. Servers and other components of the internet use the Hypertext Transfer Protocol (HTTP) which is an application protocol that provides users access to documents including text, graphics, images, sound, video, etc. using a standard page description language known as Hypertext Markup Language (HTML). HTML provides basic document formatting and allows developers to specify links to other servers and files. Links are embedded within the text of a document in the form of highlighted words or images and, when activated, cause the linked document to be retrieved and displayed. A network path to a server is identified by a Uniform Resource Locator (URL) having a special syntax for defining a network connection. An HTML compatible browser, often on a personal computer (PC) platform, permits users to request connection to the server identified in a link and to receive a document (e.g,. a web page on the internet) formatted according to HTML.

Users may dial into the internet and browse the World Wide Web. It is understood that the World Wide Web is just one part of the internet. However, because the World Wide Web is widely used, the discussion that follows below will use terms referring to an information network, the internet and the World Wide Web, without intending to limit the discussion to the specific terms that are used. Often users have sites on the internet, or web sites, that they visit often or information that they download regularly. For example, online stock traders may download the latest news and stock market quotes everyday at the open or close of the market. As another example, online sports fans may track the latest news and scores of their favorite sports teams during the games. However, these dial-up users must request a download from the internet of the information that they seek and wait for the information to download to their computer or internet browser. Thus, there is a need for a way to speed up the process of downloading information from the internet so as to minimize the wait time for the user.

One way to speed up this process has been to pre-cache internet content. Pre-caching internet content may mean downloading information from the internet that the system predicts that the user will request in the future. Generally, a cache is a place such as a memory or other storage unit where data and information can be stored to avoid having to read the data later in time. Hence, pre-caching content provides a "fat pipe" internet experience to users. Some known pre-caching systems download internet information during "off peak" periods so as to avoid traffic congestion at internet server sites. These systems may download information in the middle of the night when internet traffic is light. However, the known methods of pre-caching content fail to account for sites that contain rapidly changing information or time-sensitive information (such as news, stock quotes, or sports scores) where information downloaded during the middle of the night may be inappropriate to a user's needs, and may present the user with old or stale information. For sites containing time sensitive information, it is desirable to download the latest information available. Also, the known methods of pre-caching content suffer from additional problems. For example, these known systems may download content that is never consumed by users, wasting resources on the server and user side. Another possible problem is the risk that downloads from the internet for pre-caching purposes may conflict with or affect the user's ability to use their telephone.

For example, U.S. Pat. No. 5,961,602 describes a system that downloads or pre-caches information during "off-peak" periods so as to avoid traffic congestion at the web server sites. To do so, the system measures real-time activity on the web server sites. When the activity is low at the server site, downloading information from that server site occurs or continues. Likewise, U.S. Pat. No. 5,913,040 describes a system that downloads advertisements in real-time when the user's real-time activity on the web link falls below a certain threshold level. Thus, these older systems select the time to download information based on web traffic, not the user's predicted behavior. Moreover, when the user is not currently active on the web link, these older systems do not determine the most appropriate time of day to download information. These older systems also do not pre-cache web content before the user gets on the system in a manner that provides the most recent web information, including time sensitive information, to the user.

U.S. Pat. No. 5,961,602 mentions an "off-line" browser that downloads web pages from a list of web sites specified by the user at off-peak hours so as to avoid web traffic. This off-line browser requires the user to create a specified list of web sites that the user wants to download off-line. The off-line browser then downloads the web pages during off-peak hours when web traffic is low. This off-line browser does not predict what web content will be accessed by the user, or determine the most appropriate time of day to download time sensitive information so that the user will have the most recent information when the user decides to access the web site.

In U.S. Pat. No. 5,727,129, the system tracks the user's past history of websites visited, including the frequency and dates and times of visits, in order to predict what web information is likely to be accessed by the user in the future. The dates of times of visits are tracked so the system can determine how recently the visit occurred. This information is then pre-cached to improve the system's response time to the user's requests. In other words, while the user is contemplating what web page to access next, the system is already downloading the predicted web content. Thus, if the user selects the predicted web page, the download continues and is much closer to completion. If, however, the user selects a different web page, the downloading process aborts and the system downloads the selected web content. Hence, this system pre-caches web information that the user is predicted to access immediately on a real-time basis. By contrast, the system does not pre-cache web content before the user gets on the system and in a manner that provides the most recent web information and time sensitive information to the user. Further, this system does not determine the most appropriate time of day to pre-download the proper web content. Nor does the system take into account the expected telephone usage so that web downloads do not interfere with the use of the telephone.

In U.S. Pat. No. 5,878,223, the system predicts a user's future usage of web information based on historical usage patterns and then, during the user's real-time viewing of the website, pre-caches the next page predicted to be viewed. As with the other prior art systems, when the user is not currently active on the web link, this older system does not determine when to download information. Nor does the system determine the most appropriate time of day to download the proper web content so that the user receives the most recent information.

Therefore, there is a need for an improved system that determines the most appropriate time of day to pre-cache or download the predicted content in a manner which provides the most recent information to the user. For users that use the telephone line to connect to the internet, there is a need for an improved system that pre-caches content in a manner which minimizes the likelihood of interference with the user's use of the telephone line. In addition, there is a need to implement such an improved system such that it is capable of conserving resources on the server and client side by eliminating unwanted pre-caching downloads, and on the client side by not using up limited storage space with unwanted pre-cached content.

Further limitations and disadvantages of conventional systems will become apparent to one of skill in the art after reviewing the remainder of the present application with reference to the drawings.

SUMMARY OF THE INVENTION

Various separate aspects of the present invention can be found in an improved system, method and computer program product that pre-caches or downloads content that the system expects the user to access wherein the pre-caching occurs at the most appropriate time of day which increases the likelihood that the most recent information is provided to the user in a timely manner. For users that use the telephone line to connect to the internet, the improved system pre-caches internet content in a manner which decreases the likelihood that the pre-caching process interferes with use of the telephone line for other purposes.

A first aspect of the present invention is a method for pre-caching information from the internet that a user is expected to download without interfering with the user's expected use of the telephone line.

A second aspect of the present invention is a method for pre-caching information from the internet that a user is expected to download which includes the step of monitoring each internet site accessed by the user, the time of day of the access, and the duration of each access.

A third aspect of the present invention is a method for pre-caching information from the internet that a user is expected to download which includes the step of determining which of the information that a user downloads from the internet is time-sensitive information.

A fourth aspect of the present invention is a method for creating a schedule for pre-caching the time-sensitive information from the internet to be close to the expected time at which the user will request a download of the time-sensitive information.

A fifth aspect of the present invention is an apparatus that performs any of the above aspects.

A sixth aspect of the present invention is any of the above aspects, either individually or in some combination.

Other aspects, advantages and novel features of the present invention will become apparent from the following Detailed Description of a Preferred Embodiment, when considered in conjunction with the accompanying drawing.

DETAILED DESCRIPTION OF A PREFERRED EMBODIMENT

Figure 1:
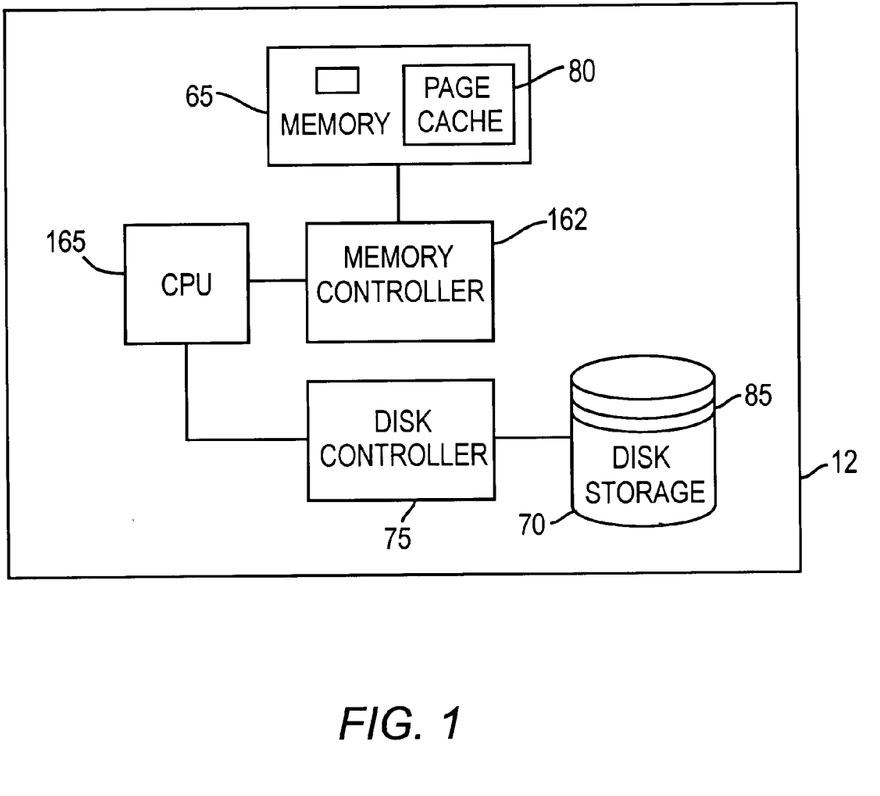
FIG. 1 is a block diagram of an example embodiment of a computer system having a cache built in accordance with the present invention.

FIG. 1 is an illustration of one embodiment of a computer system having a cache built in accordance with the present invention. The specific implementations discussed below, and in reference to the figure, do not explicitly exclude other embodiments or configurations. Turning to FIG. 1, in a preferred embodiment, the computer architecture includes a central processing unit (CPU) 165, a memory controller 162, a system memory 65, a disk storage 70, and a disk storage controller 75. The CPU 165 may be a microprocessor, microcontroller, logic unit, arithmetic logic unit, or any kind of control circuit or control unit. A portion of the system memory 65 may be set aside as a cache 80. A file space 85 on the disk storage 70 may be used as a cache in lieu of, or in addition to, the memory cache 80. In this document, the term "computer program product" is used to refer to any media used to provide programming instructions to the control unit 165.

A preferred embodiment of a system built in accordance with the present invention for pre-caching expected internet content (1) monitors a user's usage of the internet and telephone line to determine the most appropriate time of day to attempt access of information from an information network such as the internet which would not interfere with expected telephone line usage; and/or (2) monitors the time of day and the duration of time during which a user visits certain sites in order to effectuate access of the most recent information from those sites based on the time of day during which the user is expected to require the information. As used in this specification, an information network includes but is not limited to the internet. Also, the "access" of information from an information network need not include the download of the information onto the user's computer hard drive, or the displaying of that information on a monitor or other display. Rather, the information may be temporarily downloaded into RAM (Random Access Memory) or cache memory for temporary display, although downloading and displaying of that information is optional. However, when information is being "pre-cached" while the user is away from the computer, it is preferred that such "pre-cached" information be stored either on the hard drive, or in RAM or in cache memory, such that the pre-cached information can be quickly retrieved and displayed when the user requests access to such information.

For example, if a user typically visits a stock market internet site at 7 a.m. and then visits a sports site at 6 p.m., the system will schedule a downloading pre-cache of the stock market site as close to 7 a.m. as possible, taking expected telephone usage and availability into account, in order to increase the likelihood that the user will see the latest stock market information. The system will also schedule a downloading pre-cache of the sports site as close to 6 p.m. as possible. Although the user has an interest in both types of information, the sports information will not be pre-cached in the morning, and the stock market information will not be pre-cached in the evening, since such information is not desired during those time periods. Thus, by monitoring the desired time frame for information, as well as tracking whether pre-cached information is actually accessed, the system is able to conserve resources, including bandwidth resources required for the download, and memory resources required to store the pre-cached content.

There are many known ways to enable a user to access information from an information network such as the internet. Such information accessors have a communications link including but not limited to a modem, a dedicated line, a satellite link and a wireless link, as well as a device such as a browser that presents the information from the information network to the user. For example, if the system is connected to the internet by a dedicated telephone line, cable modem, DSL, or satellite, then the system would not be concerned with monitoring a user's usage of the telephone line to determine the most appropriate time of day to attempt an information download which would not interfere with expected use of the telephone line. In such a situation, the system would merely consider a user's internet usage patterns in order to pre-cache the desired information in the most timely and resource efficient manner possible, without regard to telephone line usage patterns. There are many known ways to monitor the user's usage of a communication line such as a telephone line. For example, the system can check the telephone line for a dial tone a plurality of times a day. Alternatively, the system may be informed whenever the user picks up the phone or hangs up the phone.

A system or method built in accordance with the present invention monitors the user's actual usage of the download internet information to determine what information to download, and the best time to download the information. The system may monitor the user's communication line, such as a telephone line, to determine possible conflict-free periods of time during which pre-caching or downloads should occur. Based on the user's pattern of use of the communication/telephone lines, the internet, and the downloaded information, the system can create a download schedule of what information to download and when to download it. The system may monitor these activities continuously so that the system can respond immediately to any changes in the user's pattern of behavior. If specific pre-cached content is not viewed for each new download a predetermined number of times, then the future pre-caching of such content can be eliminated, until viewing habits suggests that pre-caching such content is once again desirable. This approach preserves resources by eliminating the downloading of unwanted information, and by preserving storage space on the user's system.

For example, the system may monitor when a user is accessing the internet and when the user is not. If the user never accesses the internet between 9 a.m. and 6:30 p.m., the system may decide that there is no need to pre-cache content between 9 a.m. and, say, 5:30 p.m. This approach saves server time, conserves cache space, and reduces the risk of conflicting with the user's use of the telephone.

The system may also observe the user's selection of internet sites and content for viewing to determine what content should be cached and at what times. If the Sports Channel is only accessed after 10 p.m. and the Financial Channel is only accessed between 8:00 a.m. and 9:00 a.m., sports content need not be cached either early in the morning or during the day, and financial content need only be cached early in the morning. This approach saves server time by shortening the download time, as well as conserving cache or memory space on the client system. This approach further reduces the risk of interfering with the user's telephone, and downloads time-sensitive content as close as possible to the user's expected access times.

The system may also track the user's selection of content to determine the level of interest in a given content type (e.g., sports, finance, stocks, bonds, news flashes, special sales). Some content types may be selected more often than other types and the pattern of selection may change depending on the time of day. This information is used to prioritize content for caching so that the content of greatest interest to the user is downloaded first and the content of least interest to the user is downloaded last. Thus, if a download is interrupted or terminated, there is less detriment to the user.

When the system shares a telephone line with regular telephone usage, the system may be set up to optionally monitor the user's telephone line. By using the modem, the system monitors when the user tends to use the telephone line by checking for a dial tone at various times, or by having information regarding the usage of the telephone line provided to the system. Based on the content that the user historically has accessed at a given time of day, the system can determine the duration of the download time required. Based on the monitoring, the system determines the risk that a potential download would interfere with telephone usage depending on the time of day, the duration of expected telephone usage, and the duration of the expected download. Accordingly, the risk may range from potential conflict-free times to certain conflict times. By monitoring telephone line usage, the system can determine windows of opportunity during which content caching may occur.

Through the information and patterns of telephone line usage obtained by the monitoring process, the system may create a download schedule. Monitoring the user's actual use of internet content may determine the time before which any given download must occur in order to satisfy the user's expected use of the internet and telephone line, and increase the likelihood that the content will be as current as possible by the time the user accesses the site. The download schedule may be a table by which a server may schedule and perform targeted downloads.

The following is an example of what such a system might do. Suppose a download may be required for viewing an internet web page at 12 noon and the telephone is normally used from 11:00 a.m. to 11:45 a.m. The web content requires 22 minutes of download time, 2 minutes of which is needed to download time-sensitive information, 10 minutes of which is needed to download web content that is highly desired by the user but not time-sensitive, and 10 minutes of which is needed to download ordinary web content. The server may decide to download the highly desired but not time sensitive content at 10:30 a.m., followed by the ordinary content at 10:40 a.m. (closer to when an interruption with the telephone might occur), and then the time sensitive content at 11:55 a.m.

If the system has a dedicated means of connecting to the internet, then the system will download the 22 minutes of download content according to the anticipated time of need, i.e., the typical 12 noon viewing. In a preferred embodiment, the system is designed to track a user's internet usage patterns to determine the randomness or punctuality of a user's internet viewing habits. For example, if a user tends to view the stock pages anywhere between 6:30 a.m. and 8:00 a.m., then the system will preferably schedule the pre-cache download to be completed prior to 6:30 am, since the benefits of the system would be lost if the system tried to pre-cache at 7:30 a.m., when on that given morning, the user tried to access the information at 7:00 a.m. However, by continually updating a user's usage patterns, if the system detects that the user has recently been very punctual in their viewing of the stock pages, and the connection is typically made between 6:35 a.m. and 6:40 a.m., then the system will modify its schedule to attempt a more time-sensitive download by waiting until as close as possible to the 6:35 a.m. time to perform the pre-cache download.

The "margin of error" or threshold for the time scheduling can either be controlled automatically based upon an analysis of the user's historical usage patterns, or the user can manually set up the "lead time" for pre-caching. For example, in a preferred embodiment, the user may indicate to the system that a pre-cache should occur at least 15 minutes prior to the earliest historical connection time for a given type of session.

Figure 2:
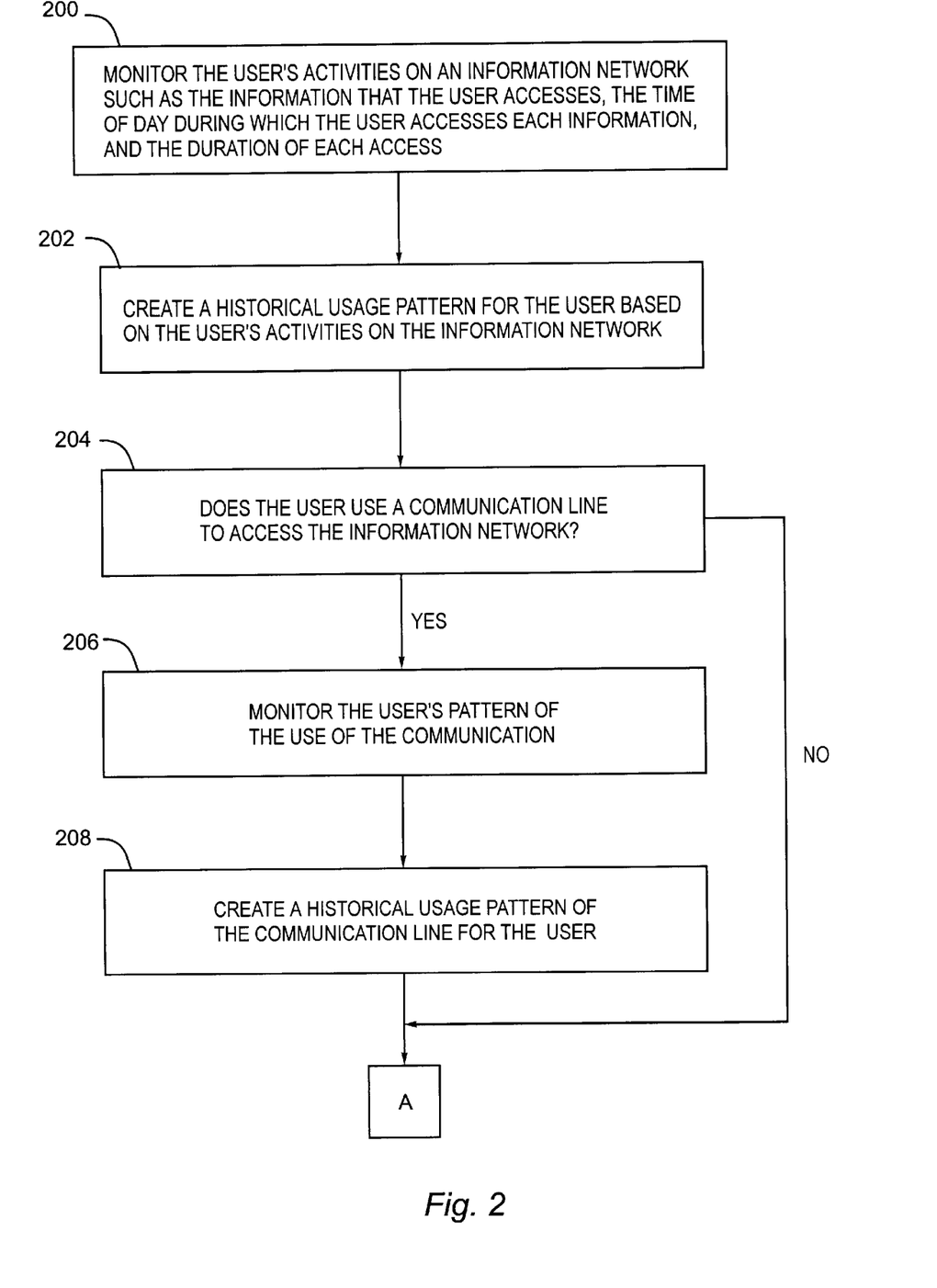
FIGS. 2–4 are flowcharts of an example embodiment of a computer program that pre-caches information from an information network according to the present invention.
Figure 3:
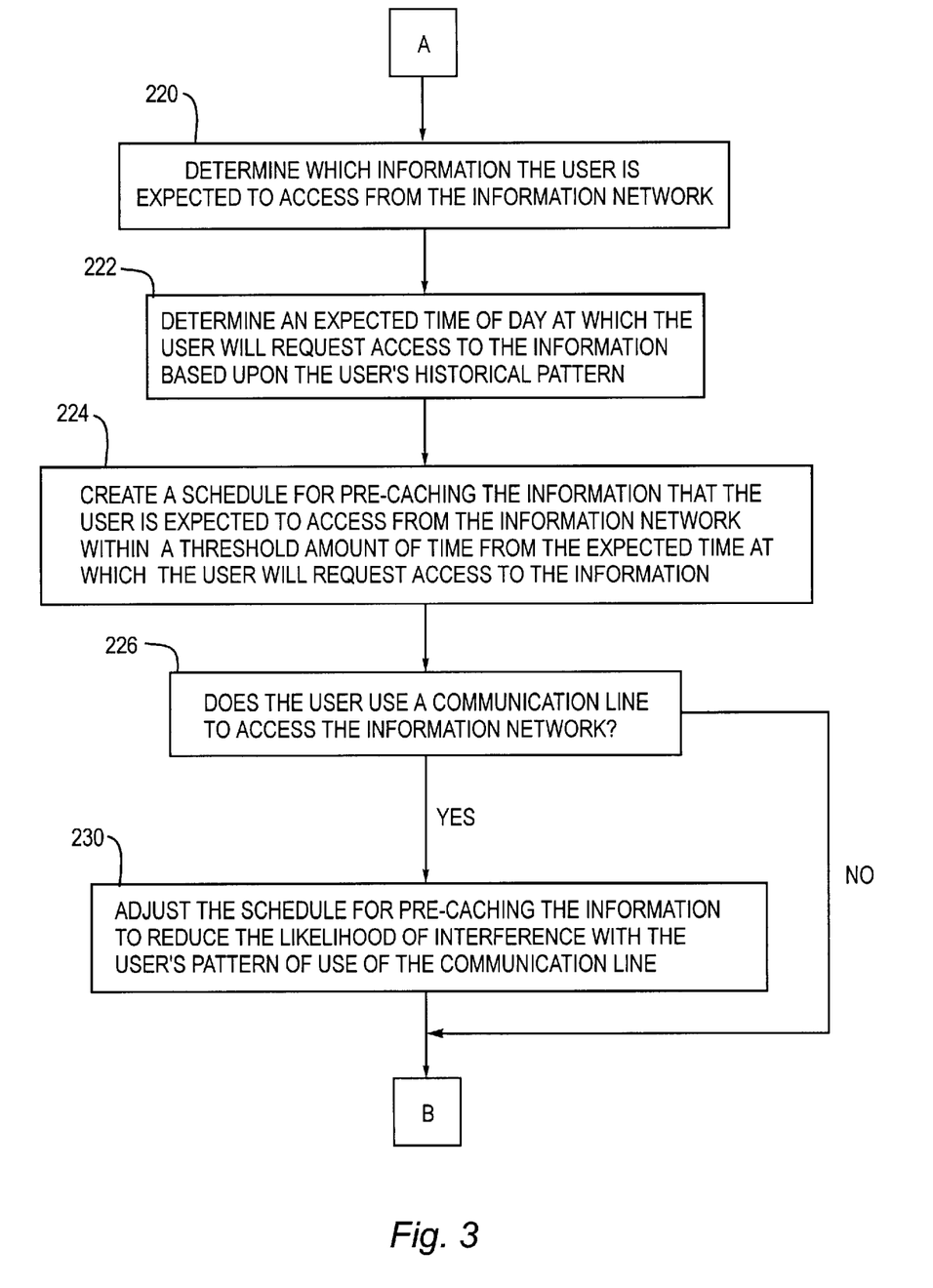
Figure 4:
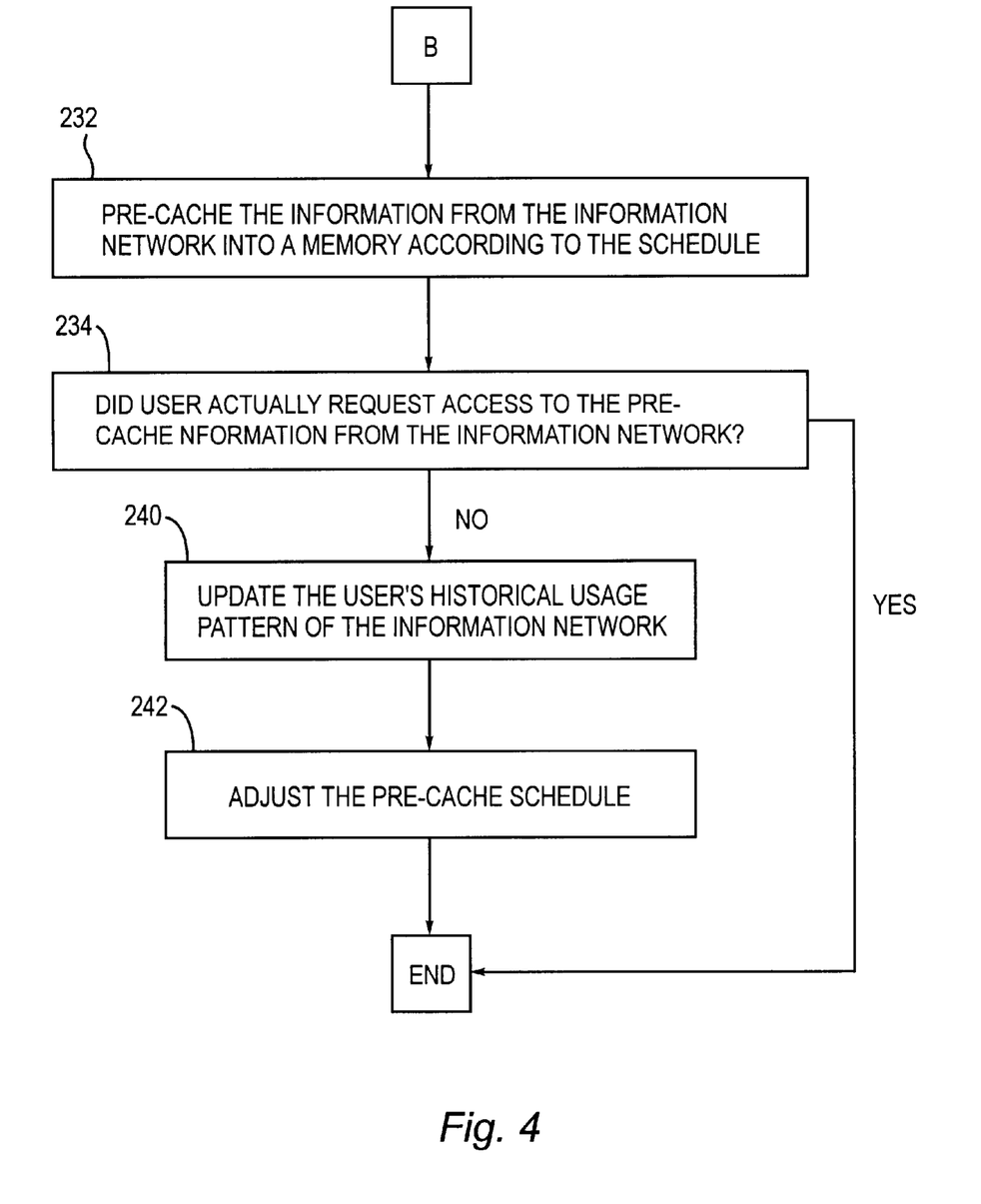

FIGS. 2–4 illustrate an example embodiment of a computer program that pre-caches information from the information network according to the present invention. In FIG. 2, step 200 monitors the user's activities on an information network such as the information that the user accesses, the time of day during which the user accesses each information, and the duration of each access. Step 202 creates a historical usage pattern for the user based on the user's activities on the information network. In step 204, the program determines whether the user uses a communication line to access the information network. If the user uses a communication line to access the information network which the user also uses for other communicating with systems other than the information network (e.g., a telephone line), the program takes steps to attempt to use the communication line in a manner that reduces the likelihood of interfering with the user's other uses of the communication line. Thus, step 206 monitors the user's pattern of use of the communication line and step 208 creates a historical usage pattern of the communication line for the user.

Turning to FIG. 3, steps 220 and 222 determine which information the user is expected to access from the information network and the expected time of day at which the user will request access to the information based upon the user's historical usage pattern. Step 224 creates a schedule for pre-caching the information that the user is expected to access from the information network within a threshold amount of time from the expected time at which the user will request access to the information. The amount of the threshold may be predetermined, determined based on calculations performed by the program based upon usage patterns, as discussed above, or manually set by the user. Step 226 determines whether the user uses a communication line to access the information network. If the user uses a communication line to access the information network, step 230 adjusts the schedule for pre-caching the information to reduce the likelihood of interference with the user's pattern of use of the communication line. If the user does not use a communication line to access the information network, step 230 for adjusting the schedule is skipped.

Turning to FIG. 4, step 232 pre-caches the information from the information network according to the schedule. The information may be pre-cached into a memory or any other type of storage device. Step 234 determines whether the user actually requested access to the pre-cached information from the information network. If the user did not actually request access to the pre-cached information from the information network, the historical usage pattern for the user is updated in step 240 and the schedule for pre-caching the information is adjusted in step 242. Optionally, if the user actually request access to the pre-cached information from the information network, the historical usage pattern for the user may be updated (not shown in FIG. 4).

While embodiments and implementations of the subject invention have been shown and described, it should be apparent that many more embodiments and implementations are within the scope of the subject invention. Accordingly, the invention is not to be restricted, except in light of the claims and their equivalents.

What is claimed is:

1. A method of tracking a user's activities to provide information that the user is expected to request from an information network based on the user's historical usage pattern, the method comprising the steps of:

(a) monitoring the user's activities on the information network including the information that the user accesses from the information network and the time of day during which the user accesses each information from the information network;

(b) creating a historical usage pattern for the user based on the user's monitored activities;

(c) determining which information is expected to be accessed by the user from the information network;

(d) determining an expected time of day at which the user will request access to the information from the information network based upon the user's historical usage pattern;

(e) creating a schedule for pre-caching the information from the information network within a threshold amount of time from the expected time at which the user will request access of the information; and (f) pre-caching the information from the information network according to the schedule.

2. The method of claim 1 further comprising the step of monitoring the user's pattern of use of a communication line and the schedule creation step schedules pre-caching information from the information network while reducing the likelihood of interference with the user's pattern of use of the communication line.

3. The method of claim 2 wherein the communication line is a telephone line.

4. The method of claim 2 wherein the information network is the internet.

5. The method of claim 1 wherein the step of monitoring the user's activities on the information network includes the step of monitoring each site accessed by the user, the time of day of the access, and the duration of each access.

6. The method of claim 5 wherein the information network is the internet.

7. The method of claim 1 wherein the step of monitoring the user's activities on the information network includes the step of monitoring what information is accessed by the user from the information network, the time of day of the access and the duration of the access.

8. The method of claim 7 wherein the monitoring step monitors what information is downloaded by the user from the information network.

9. The method of claim 1 further comprising the step of monitoring whether the user actually accesses the pre-cached information from the information network and the step of adjusting the pre-cache schedule based on whether the user actually accessed the pre-cached information.

10. The method of claim 9 wherein the step of adjusting the pre-cache schedule includes eliminating from the pre-cache schedule future pre-caching of information when a predetermined number of instances of pre-caching of the particular information have not been viewed by the user.

11. The method of claim 1 wherein the information network is the internet.

12. The method of claim 1 wherein the pre-caching of the information from the information network is performed within a threshold amount of time prior to the expected time at which the user will request access of the information.

13. The method of claim 1 further comprising the step of prioritizing information to be pre-cached according to interest of the user in the information of be pre-cached, and the step of adjusting the pre-cache schedule so that information of relatively greater interest is scheduled to be cached prior to information of relatively lesser interest.

14. A method of tracking a user's activities in order to pre-cache information from the information network during a time when the user is not accessing the information network, the method comprising the steps of:
   (a) monitoring the user's pattern of use of a communication line;
   (b) monitoring the user's activities on the information network including the information the user accesses from the information network and the time of day during which the user accesses each information from the information network;
   (c) creating a schedule for pre-caching the information from the information network without interfering with the user's pattern of use of the communication line; and
   (d) pre-caching the information from the information network according to the schedule.

15. The method of claim 14 wherein the step of monitoring the user's pattern of use of a communication line includes the step of monitoring the time of day and duration during which the communication line is used.

16. The method of claim 15 wherein the communication line is a telephone line and the step of monitoring the time of day and duration during which the communication line is used includes checking the communication line for a dial tone a plurality of times a day.

17. The method of claim 15 wherein the communication line is a telephone line and the step of monitoring the time of day and duration during which the communication line is used includes a system that is informed when the user picks up the telephone and when the user hangs up the telephone.

18. The method of claim 15 wherein the information network is the internet.

19. The method of claim 14 wherein the step of monitoring the user's activities on the information network includes the step of monitoring each site accessed by the user, the time of day of the access, and the duration of each access.

20. The method of claim 14 wherein the step of monitoring the user's activities on the information network includes the step of monitoring what information is accessed by the user from the information network, the time of day of the access and the duration of the access.

21. The method of claim 20 wherein the information network is the internet.

22. The method of claim 14 further comprising the step of monitoring whether the user actually accesses the pre-cached information and the step of adjusting the pre-cached schedule based on whether the user actually accessed the pre-cached information.

23. The method of claim 22 wherein the information network is the internet.

24. The method of claim 14 wherein the communication line is a telephone line.

25. The method of claim 14 wherein the information network is the internet.

26. The method of claim 14 wherein the step of monitoring the user's activities on the information network monitors what information is downloaded by the user from the information network.

27. A computer readable medium having an application stored thereon for causing a computer to implement a method for tracking a user's activities in order to provide information that the user is expected to request from an information network based on the user's historical usage pattern, comprising the steps of:
   (a) monitoring the user's activities on the information network including the information that the user accessed from the information network and the time of day which the user accesses each information from the information network;
   (b) creating a historical usage pattern for the user based on the user's monitored activities;
   (c) determining which information is expected to be accessed by the user from the information network based on the user's historical usage pattern;
   (d) determining an expected time of day at which the user will request access to the information from the information network based on the user's historical usage pattern;
   (e) creating a schedule for pre-caching the information from the information network within a threshold amount of time from the expected time at which the user will request access to the information; and
   (f) pre-caching the information from the information network according to the schedule.

28. The computer readable medium implementing the method of claim 27 further comprising the step of monitoring the user's pattern of use of a communication line and the scheduling code schedule pre-caching information from the information network while reducing the likelihood of interference with the user's pattern of use of the communication line.

29. The computer readable medium implementing the method of claim 28 wherein the communication line is a telephone line.

30. The computer readable medium implementing the method of claim 28 wherein the information network is the internet.

31. The computer readable medium implementing the method of claim 27 wherein the step of monitoring the user's activities on the information network monitors each site accessed by the user, the time of day of the access, and the duration of each access.

32. The computer readable medium implementing the method of claim 31 wherein the information network is the internet.

33. The computer readable medium implementing the method of claim 27 wherein the step of monitoring the user's activities on the information network monitors which information is downloaded by the user from the information network, the time of day of the download and the duration of the download.

34. The computer readable medium implementing the method of claim 27 further comprising the step of monitoring whether the user actually accesses the pre-cached information and code for adjusting the pre-cache schedule based on whether the user actually accesses the pre-cached information.

35. The computer readable medium implementing the method of claim 34 wherein the information network is the internet.

36. The computer readable medium implementing the method of claim 27 wherein the information network is the internet.

37. An apparatus for tracking a user's activities in order to provide information that the user is expected to request from an information network based on the user's historical usage pattern, the apparatus comprising:
   (a) an information accessor that permits a user to access information on the information network;
   (b) a control unit capable of monitoring the user's activities on the information network through the information accessor including the information that the user accesses from the information network and the time of day during which the user accesses each information from the information network, the control unit determining which information is expected to be accessed by the user from the information network and an expected time of day at which the user will request access to the information from the information network, the control unit also creating a schedule for pre-caching the information from the information network within a threshold amount of time from the expected time at which the user will request access to the information based on the user's historical usage pattern; and
   (c) a storage device for pre-caching the information from the information network according to the schedule.

38. The apparatus of claim 37 wherein the control unit monitors the user's pattern of use of a communication line and schedules the pre-caching of information from the information network into the storage device while reducing the likelihood of interference with the user's pattern of use of the communication line.

39. The apparatus of claim 38 wherein the communication line is a telephone line.

40. The apparatus of claim 38 wherein the information network is the internet.

41. The apparatus of claim 37 wherein the control unit monitors each site accessed by the user, the time of day of the access, and the duration of each access.

42. The apparatus of claim 41 wherein the information network is the internet.

43. The apparatus of claim 37 wherein the control unit monitors what information is downloaded by the user from the information network, the time of day of the download and the duration of the download.

44. The apparatus of claim 37 wherein the control unit monitors whether the user actually accessed the pre-cached information in the storage device and adjusts the creation of the pre-cached schedule based on whether the user actually accessed the pre-cached information.

45. The apparatus of claim 44 wherein the information network is the internet.

46. The apparatus of claim 37 wherein the information network is the internet.

47. A computer readable medium having a computer program product stored thereon for causing a computer to implement a method for tracking a user's activities in order to provide information that the user is expected to request from an information network based on the user's historical usage pattern, comprising the steps of:
   (a) monitoring the user's activities on the information network including the information that the user accesses from the information network and the time of day during which the user accesses each information from the information network;
   (b) determining which information is expected to be accessed by the user from the information network;
   (c) determining an expected time of day at which the user will request access to the information from the information network based on the user's historical usage pattern;
   (d) creating a schedule for pre-caching the information from the information network within a threshold amount of time from the expected time at which the user will request access to the information; and
   (e) pre-caching the information from the information network according to schedule.

48. The computer readable medium implementing the method of claim 47 further comprising the step of monitoring the user's patterns of a use of a communication line and the scheduling instructions schedules pre-caching information from the information network while reducing the likelihood of interference with the user's pattern of use of the communication line.

49. The computer readable medium implementing the method of claim 48 wherein the communication line is a telephone line.

50. The computer readable medium implementing the method of claim 48 wherein the information network is the internet.

51. The computer readable medium implementing the method of claim 47 wherein the step of monitoring the user's activities on the information network monitors each site accessed by the user, the time of day of the access, and the duration of each access.

52. The computer readable medium implementing the method of claim 51 wherein the information network is the internet.

53. The computer readable medium implementing the method of claim 47 wherein the step of monitoring the user's activities on the information network monitors which information is downloaded by the user from the information network, the time of day of the download and the duration of the download.

54. The computer readable medium implementing the method of claim 47 further comprising the step of monitoring whether the user actually accesses the pre-cached information and instructions for adjusting the pre-cached schedule based on whether the user actually accessed the pre-cached information.

55. The computer readable medium implementing the method of claim 54 wherein the information network is the internet.

56. The computer readable medium implementing the method of claim 47 wherein the information network is the internet.

* * * * *